Figure 1:
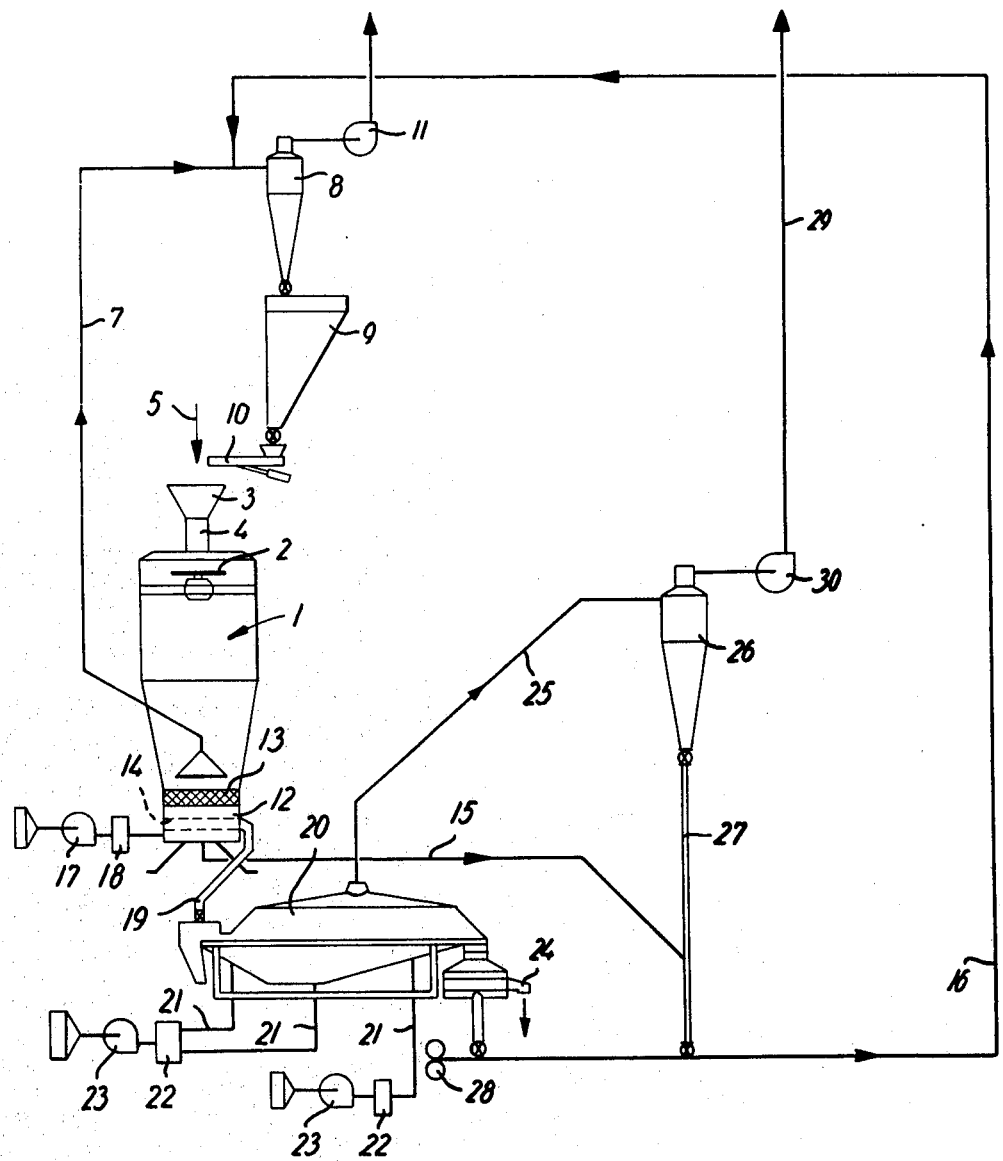

_United States Patent_ [19]

Hansen et al.

[11] 3,966,975

[45] June 29, 1976

[54] METHOD FOR PRODUCING AGGLOMERATED POWDERS AND APPARATUS FOR PERFORMING THE METHOD

[75] Inventors: Karl Erik Hansen, Copenhagen; Ove Hansen, Vaerlose, both of Denmark

[73] Assignee: Aktieselskabet Niro Atomizer, Soborg, Denmark

[22] Filed: July 19, 1973

[21] Appl. No.: 380,794

Related U.S. Application Data

[63] Continuation-in-part of Ser. No. 206,710, Dec. 10, 1971, abandoned.

[30] Foreign Application Priority Data

Dec. 21, 1970 United Kingdom............... 60700/70
Dec. 10, 1971 Germany........................... 2161448
Dec. 21, 1971 Japan............................... 46-103303

[52] U.S. Cl............................. 426/285; 23/313 R; 264/117; 425/222; 426/453; 426/594; 99/471; 99/474; 99/516

[51] Int. Cl.²....................................... A23C 9/00

[58] Field of Search............. 23/313; 426/285, 453, 426/302, 193, 594, 595, 596, 456; 264/6, 117; 425/222, 453; 99/471, 474, 516

[56] References Cited

UNITED STATES PATENTS

| 2,897,084 | 7/1959 | Peebles | 426/453 |
| 3,295,838 | 1/1967 | Ban | 425/222 |
| 3,679,416 | 7/1972 | Reich | 426/453 |

_Primary Examiner_—S. Leon Bashore
_Assistant Examiner_—Peter Chin
_Attorney, Agent, or Firm_—Sughrue, Rothwell, Mion, Zinn & Macpeak

[57] ABSTRACT

A method and an apparatus for producing agglomerated powders such as coffee powder, coffee substitutes such as chicory and other highly hygroscopic and thermoplastic powders in which powder is made to fall down against a central area of a rotating disc. The powder is moistened during the fall against the disc by the supply of steam or finely atomized water across the central area of the disc at such a distance above the same that practically all the powder is moistened before it hits the disc.

26 Claims, 4 Drawing Figures

METHOD FOR PRODUCING AGGLOMERATED POWDERS AND APPARATUS FOR PERFORMING THE METHOD

This application is a continuation-in-part of applicant's copending application Ser. No. 206,710, filed Dec. 10, 1971, and now abandoned.

The present invention relates to a method for producing agglomerated soluble coffee powder products. The term soluble coffee powder products in this specification is used to describe powders for the preparation of coffee or coffee flavoured drinks which powders consist of pure soluble coffee or soluble coffee substitutes such as chicory or blends of these products. The powder may further contain sugars-e.g., dextrose. These products are characterized by being highly hygroscopic and thermoplastic, and they are therefore difficult to agglomerate by known methods.

The present invention particularly relates to a method for producing agglomerated soluble powder products for coffee or coffee substitutes from a powder of the raw materials which is moistened and made to fall on to a rotating disc, by the rotation of which the powder is led out to the circumference of the disc and drops down through a chamber, from which the agglomerated powder goes into a drying apparatus.

The agglomerated powder has to meet the requirement of being able to resist the mechanical effects it will normally be subjected to during packing and when being transported and, at the same time, the agglomerated powder has to, when poured into water, be quickly separated into the original particles so that a rapid dissolution may be obtained.

The principle of agglomerating powders consists in that the individual grains of powder are rendered adhesive on their surfaces and are made to collide with each other so that they come to adhere together in bigger or smaller agglomerates. The surfaces can be rendered adhesive either by means of an adhesive agent or by a superficial moistening in such a way that a thin surface layer is dissolved and becomes adhesive. When legislation prohibits foreign substances from being introduced, only the latter method may be available.

While it is possible to moisten certain powders, as, for instance, skimmed milk powder, without any difficulty in order to form an adhesive surface layer, this is connected with great difficulties with other powders. This applies, for example, to coffee powder, since the individual grain of powder has a tendency to rapidly absorbing moisture so that the total solid matter content or, at any rate, the greater part thereof is dissolved so that the grains, when colliding with each other, acquire a tendency to coalesce instead of merely superficially sticking together as is necessary for forming the desired agglomerates.

A method of the kind dealt with above is known, in which the powder drops down on to a rotating disc, while water is being sprayed in an area along the circumference of the disc and, in part, outside same through a plurality of nozzles which are distributed along the circumference. Consequently, the powder will, in a dry state, move outwards along the surface of the disc to the sprayed area where the powder is rapidly moistened before subsequently being flung out over the edge to an area in which moisture is also supplied. This method, which is described in French Pat. no. 1577656, is not suitable when it is a question of coffee powder products, but it has been developed for use in the production of such products as soup powders, powdered mashed potato, and other powders having corresponding properties.

The method according to the invention is characterized in that the powder is made to drop down towards a central area of the disc and in that the moistening takes place by the supply of steam or finely atomized water over a central area of the disc at such a distance above same that substantially all the powder is moistened before it hits the disc.

Preferably, the powder is supplied in such a way that it is uniformly distributed across the cross section of the moistening zone. The amount of powder supplied per unit of area of the disc may be from 0.2–5.3 kg/m$^2$sec, preferably 0.4–2.4 kg/m$^2$sec. Water may be used as the moistening agent, and the water may be heated prior to being supplied. Instead of water, however, an aqueous extract having a solid matter content of the same material as that of which the powder consists may be used. Also steam may be used for moistening the powder. The steam should be saturated but not superheated because the steam has to condense the powder particles.

Thus the powder drops on to the central portion of the disc immediately after having been moistened or on to a quantity of powder accumulated on this central portion which in some cases may build up into a cone-like cake, whereby it has to be assumed, that agglomerates are formed at so early a moment that the water has not yet succeeded in being absorbed into the inside of the individual grains of powder. From this central part, the powder is flung outwards towards the circumference of the disc in an agglomerated form, whereupon the agglomerate is flung into the dryer. Fine, unagglomerated powder may be separated in the chamber and conducted back for processing while the agglomerates are conducted from the dryer to be packaged and dispatched. It is also possible to separate unagglomerated powder particles from the dryer and the succeeding transport system which are likewise returned for processing.

The disc is suitably rotated at a speed between 200 and 3000 rpm, preferably 600–1300 rpm, and the rotating disc does to some extent act as a centrifugal blower, so that a vacuum is created around the axis of rotation of the disc. This vacuum results in a constriction of the falling mass of powder, so that the powder hits the disc in a fairly concentrated central area, which appears to be of great significance for obtaining the desired result.

As a consequence of the collision of the particles taking place immediately upon moistening, the formation of the agglomerates occur even before the volume of liquid supplied has been able to disperse inside the individual particles. This has as a result that only an insignificant amount of liquid has to be supplied, that is to say just enough for moistening the surface, so that same is sticky when the collisions occur, but immediately afterwards, the moisture is going to disperse rapidly due to the properties of the powder which, on account of the small amount of liquid involved, results in a rapid solidification of the surface layer and, thereby, in a very stable binding together of the particles in the agglomerates formed.

The invention does, moreover, relate to an apparatus for carrying out the method according to the invention, which apparatus consists of a chamber having, at the top, a powder and a water and/or steam inlet and a rotating disc mounted below the powder inlet, the axis of rotation of said disc coinciding with the axis of the chamber and the characteristic feature of this apparatus according to the invention is that the powder inlet comprises a tube terminating above a central area of the disc and mounted parallel to the axial direction of the chamber, and that the inlet for the water or steam is constituted of one or several nozzles mounted in or in the proximity of the mouth of the tube and with its direction of discharge towards the disc.

With such an apparatus particularly satisfactory results are obtained, which are obviously due to the fact that by regulating the volume of liquid supplied in relation to the quantity of powder and the number of revolutions of the disc, it is possible to attain the best conditions possible for the desired agglomerate formation.

Figure 2:
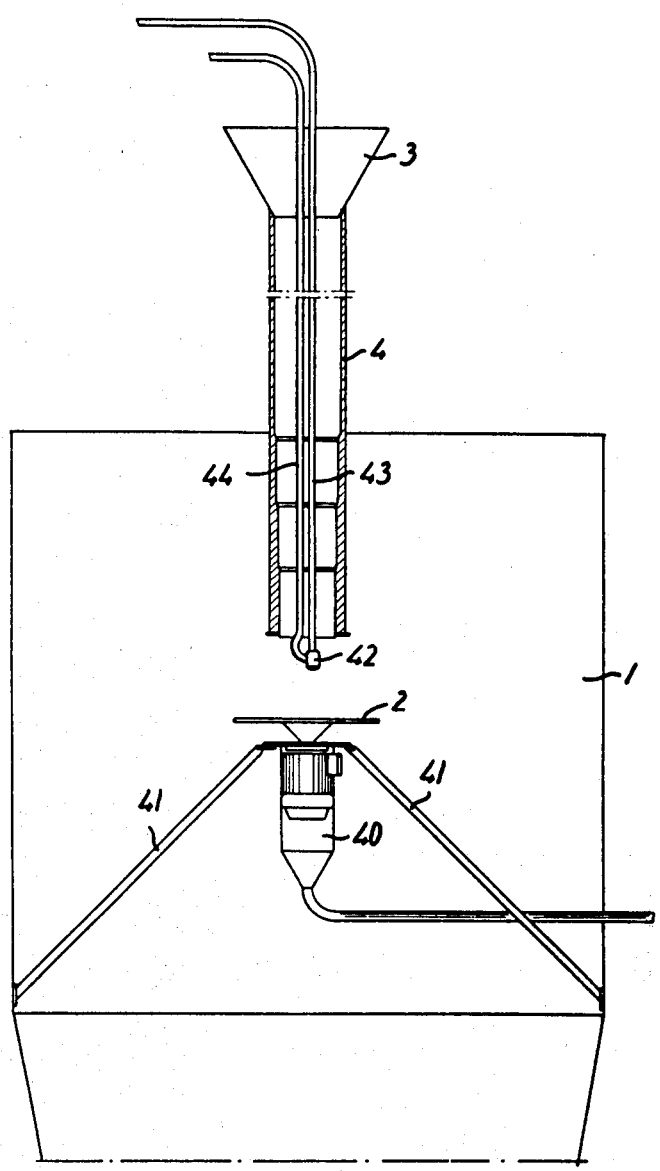
Figure 3:
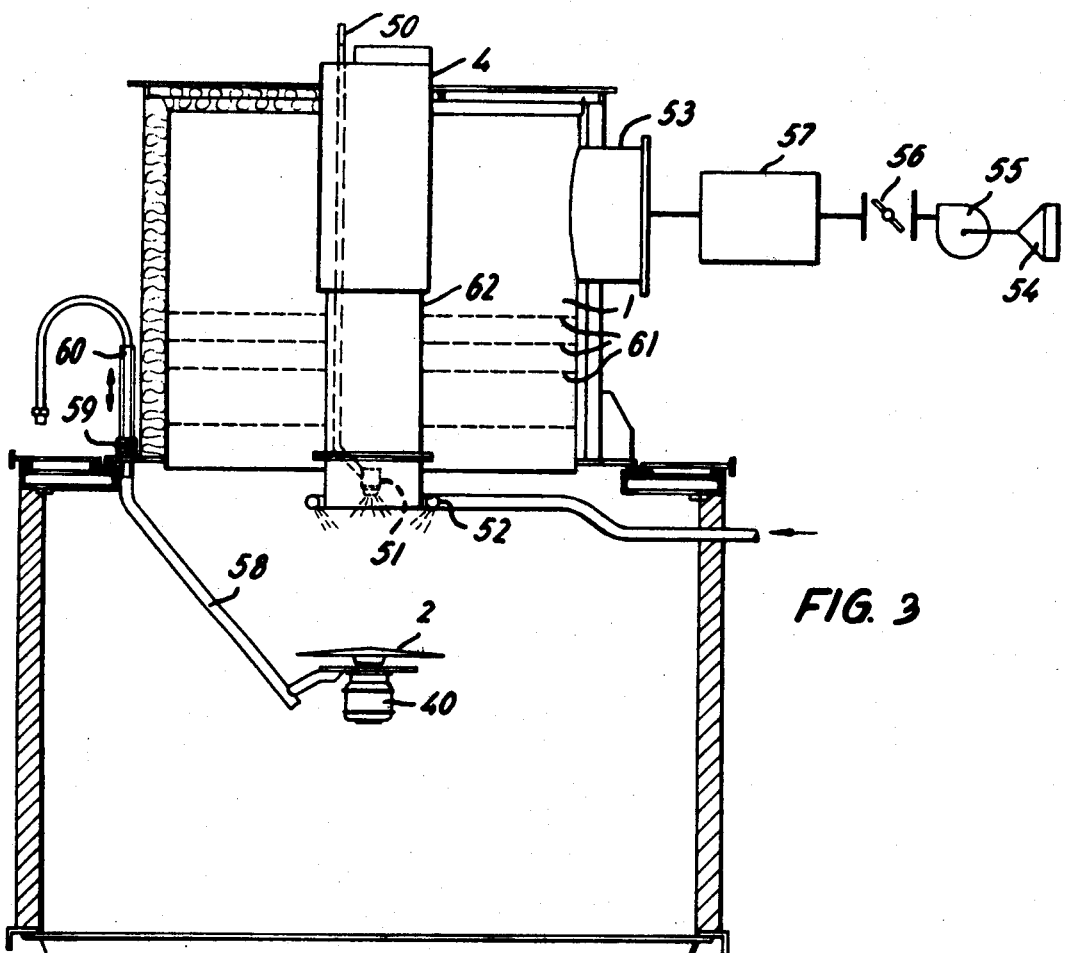
Figure 4:
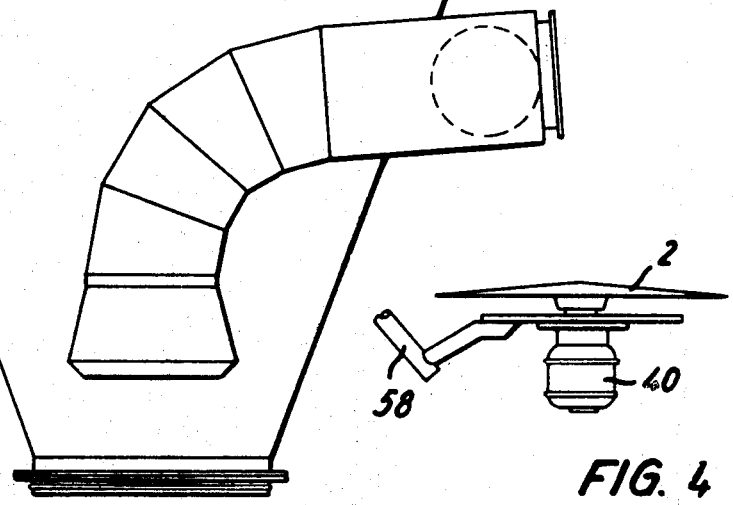

In the following, the invention is explained in greater detail with reference to the drawings, in which:

FIG. 1 shows a diagram of a plant for carrying out the method according to the invention, FIG. 2 shows a detail of the apparatus according to the invention seen in section, FIG. 3 a further embodiment of the detail shown in FIG. 2, and FIG. 4 another embodiment of the disc 2 shown in FIG. 1–3.

In FIG. 1, 1 designates a chamber with a rotating disc 2, on to which the powder drops which is introduced via a funnel 3 that continues in one or more tubes 4, the powder during its drop being moistened by means of liquid or vapour e.g. steam which is supplied via a tube 5 above a central area of the disc 2. The powder is fed into the funnel 3 from a silo 9 with the aid of a vibrating chute 10. The powder is flung off the disc 2 in an agglomerated state and drops down through the chamber, which is open at the top, in such a way that air is drawn in which is imparted a rotating movement by the disc.

In the chamber 1, a separation of fine, unagglomerated particles takes place which are drawn off by suction with air that is absorbed via a tube 7 which terminates axially in chamber 1 and which is screened off against the dropping powder.

The air is led via tube 7 to a cyclone 8, in which the fine powder is separated and drops into the silo 9. The air is drawn off from the cyclone 8 by means of a blower 11.

The separation of unagglomerated powder is not absolutely necessary, but such separation is desirable in industrial production in order to retain the aroma which would otherwise be damaged during multiple passages through the drier 20 which is further described in the following.

The lowermost part 12 of the chamber 1 is displaceable in relation to the other part of the chamber, with which it communicates by means of a pliant sleeve 13. This part 12 comprises a vibrating sieve 14, by means of which remaining amounts of fine particles are separated and conducted via a transport line 15 to an additional transport line 16 which leads the fine powder up to the cyclone 8.

The sieve 14 is, by way of example, a combined sieve comprising a coarse sieve of a mesh width of 16 mms and a fine sieve of a mesh width of 500 to 1500µ.

In the lowermost part of the chamber, a certain volume of air is introduced by means of a blower 17 and, for a suitable heating of this volume of air, a heating unit 18 is inserted in conjunction with the blower 17 and the chamber 1.

The agglomerated particles that are sifted off proceed via a line 19 to a drier 20 of a known type, where the agglomerated powder is moved in a fluidized state on to a vibrating table which is divided into sections and through which hot air is blown in three different steps via lines 21, which are connected with the blower 23 via heating units 22.

The powder leaves from exit 24 of the drier 20, which exit may be connected to a suitable conveyor to a pacing station. Before the exit 24, a vibrating sieve is inserted for sifting off the finer powder, which is also fed into line 16.

The air discharge from the drier 20 is led via a line 25 to a cyclone 26, in which powder that might have been carried along is separated and drops, via a line 27, down into the transport line 16. To this line, moreover, a blower 28 is connected for producing the requisite transporting air.

The humid air leaves the cyclone 26 to an air exit 29, in which a blower 30 is inserted.

FIG. 2 shows an embodiment of the upper part of the chamber 1 with the disc 2, which is mounted with its axis of rotation axially in the chamber and which is driven by a motor 40, which is likewise mounted in the axis of the chamber and which is borne by carrying means 41 which are connected to the wall of the chamber 1.

Centrally outside the mouth of the tube 4 above the central area of the disc 2 there is provided a nozzle 42. The nozzle is preferably a multi-fluid nozzle with an inlet duct for the moistening agent and an inlet duct for an atomizing agent such as air or vapour or a mixture thereof. In the embodiment shown, a nozzle 42 is mounted with an inlet tube 43 for liquid and a compressed air line 44. The nozzle can suitably be mounted outside the mouth of the tube 4 as shown in FIG. 2 or at such distance inside the tube that the atomizing cone of the nozzle just avoids touching the rim of the tube, e.g. as shown in FIG. 3.

The principle of the agglomeration process is that the powder, on its way from the mouth of tube 4 to the disc 2, is superficially moistened by means of the finely dispersed liquid issuing sprayed by nozzle 42 and that by colliding with the central part of the disc, where already previously powder particles have lodged themselves, it forms agglomerates that are flung off the disc on account of its rotation and drop down through chamber 1.

In order to achieve a uniform moistening, the powder particles will have to be uniformly distributed across the cross section of the mouth of the tube, which it is possible to achieve by adjusting the position of the vibrating chute 10 in FIG. 1.

The length of the tube 4 is approximately equal to the path of fall which the powder has to traverse in order to attain a uniform distribution at the level of the nozzle 42. Said path of fall depends particularly upon the type and size of the powder particles to be agglomerated and it can be determined experimentally. During the fall of the powder particles from the region around the nozzle towards the disc 2 the falling velocity of the particles is further increased owing to the ejector effect of the nozzle 42 and the vacuum created around the center of the disc due to its rotation. It is possible thereby to achieve that the particles, by an adequate supply of liquid, are sufficiently moistened on the surface so that on their way from the mouth of tube 4 to the disc the agglomeration can take place, while, at the same time, the liquid supplied is unable to penetrate to any great extent into the powder particles due to the short time required by the dropping powder particles for covering the way from the moment when they are moistened to hitting the disc.

It is thus only necessary to supply the volume of liquid adequate for obtaining the requisite surface adhesiveness, and the individual particles retain their nature of solid matter a very short distance below the surface, so that by means of the collisions agglomerates having the desired properties are obtained-that it to say, agglomerates in which the individual grains still appear clearly distinct without any disadvantageous coalescence, in that they are only superficially stuck together.

Subsequent to the collision, of course, the liquid is going to disperse from the surface into the inside of the particles, but on account of the very insignificant amount of liquid involved, no softening will be produced thereby, but, on the contrary, a solidification of the surface, because the liquid content of same is greatly reduced by the dispersion of the liquid in the particle. During the operation, a flat cone of material may build up on the central area of the disc since the speed of rotation in the proximity of the axis is very low. The greater part of the particles will, however, continue to move outwards with increasing speed to be replaced by new ones, and it seems as if it is, to a significant degree, the collision between these particles and the suceeding falling particles which gives rise to the agglomerate formation.

The diameter of the mouth of tube 4 must, at the most, be equal to the diameter of the disc since the falling particles have to perforce hit the disc and in practice it should not be much more than half the diameter of the disc. The diameter of the disc may be 1–10 times that of the tube 4, preferably about 3 times the diameter of the tube.

On their way from the mouth of tube 4 to the disc, the powder particles will tend to be spread on account of the air or vapour originating from the nozzle. This tendency is counteracted and eliminated due to the rotation of the disc, by means of which an air vortex is produced, in that the air is drawn in by suction to the axial area of the disc due to the fan effect produced by the rotation of the disc. Thereby, the volume of the mass of falling powder substantially takes the shape of a hyperboloid, so that all the powder hits a central area of the disc.

The distance from the mouth of the tube 4 to the disc 2 has to be sufficient for all the powder to be moistened. This distance has to be in the range of between 1 and 10 times, preferably between 4 and 7 times, the diameter of the tube. In in order to be able to easily set this distance to the most favourable value, tube 4, in the construction shown, is telescopic.

The disc 2, in the construction shown, is planar, which, as a rule, yields satisfactory results, while a slightly conical shape with an upwards facing point may be preferred in some cases.

A disc 2 having a faint conical shape is shown more detailed in FIG. 4. The top of the cone which has a great top angle is facing the particle inlet tube 4 and the nozzle.

A polytetrafluorethylene coating on the disc often has a favourable effect towards avoiding undesirable deposits.

In the production of agglomerated coffee powder, a coffee powder having a bulk density, poured, of 0.14–16 g/cm$^3$ and a water content of 2–4% by weight is expediently used as starting material.

Water at ambient temperature may be used for the moistening. The water may possibly be heated, whereby it is possible to use a smaller volume of water for moistening and to reduce the drying period in the drier.

Instead of water, it is possible to use an aqueous coffee extract, preferably an aromatized extract, that is to say an extract of high aroma content which is produced either by low yield extraction, by means of which a high content of valuable aroma is obtained, or by adding aroma to an extract. The extract may have a solid matter content of 10%–50%. The upper limit of the solid matter content is not critical and is only determined by the viscosity of the extract since it is required that the moistening agent can be atomized in a two-fluid nozzle.

Further to the agglomeration of coffee powder as described, the method and apparatus of the present invention are also quite suitable for agglomerating coffee substitute products, especially products containing chicory. Like coffee powder, such products are also highly hygroscopic and thermoplastic. Also coffee powder products containing sugars such as glucose may be treated by the process of the invention, and even powders consisting exclusively of sugar such as glucose may be treated by said process. As moistening agent there may then be used water, steam or an aqueous solution of sugar.

Moistening is carried out to 6%–12% water content by weight, preferably though to 7.5%–10%. By using an extract instead of pure water, a correspondingly larger volume is used in order to obtain the same volume of water.

In FIG. 3 is shown a further embodiment of the detail of the apparatus according to the invention which is shown in FIG. 2.

In the embodiment of FIG. 3, the moistening agent is supplied through tube 50 with nozzle 51. In order to further support the moistening of the particles falling through the tube 4, an annular steam tube 52 which surrounds the nozzle 51 is placed around the mouth of the tube 4. The annular tube 52 has a number of discharge openings along its periphery through which openings steam can be sprayed downwards at an angle as shown by the dotted lines in FIG. 3. Thereby a further turbulence is provided in the moistening zone so that a more uniform moistening of the particles is obtained. The same effect might be obtained by means of a circumferential slot in the annular tube 52 in stead of the above mentioned openings.

When the relative humidity of the atmosphere is high, there may be some risk that powder will adhere to the inner wall of the chamber 1. For this reason there is in the embodiment of FIG. 3 introduced a drying gas into the chamber 1 through a conduit 53. This drying gas is supplied from a filter 54 through a fan 55 and a sviwel damper 56 to a heater 57. In this heater 57 the drying gas is heated to a temperature of approximately 60°–70°C before it enters the chamber 1.

A number of perforated plates 61 serves to distribute the drying gas uniformly over the cross section of the upper part of the chamber.

The telescopic mounting of the tube 4, which is described in connection with the explanation of FIG. 2, is shown at 62 in FIG. 3, but the adjustability of the distance between the mouth of tube 4 and the disc 2 can as shown in the embodiment of FIG. 3 also be obtained by a displaceable mounting of the disc 2. The disc 2 is together with its motor 40 supported by a carrying means 58 which is lead through the wall of the chamber 1 by means of a guiding member 59 which cooperates with a rectilinear guiding portion 60 of the carrying means in such a manner that the guiding portion 60 is movable in the guiding member 59 against some friction. The guiding member 59 might be provided with a clamping means such as a lock nut or a rubber gasket for arresting the guiding portion 60 in order to place the disc 2 in a desired position.

EXAMPLE I

A plant as shown in FIG. 1 was used.

The diameter of the supply tube was 15 cm.

The diameter of the disc was 50 cm and it rotated at 700 rpm.

The distance from the supply tube to the disc was 80 cm and from the nozzle to the disc 85 cm.

A multi-fluid nozzle having an aperture of 1.2 mm and an angle of spread of 20°–30° was employed. Air was used for the atomization, water at ambient temperature was used as the moistening agent and it was supplied at the rate of 50 kg/h.

The sieve 13 consisted of a circular, rotating double sieve having a coarse sieve at the top with a mesh width of 5 mm and a fine sieve at the bottom with a mesh width of 800$\mu$.

A spray-dried coffee powder having a water content of 2.8% by weight and a bulk density, when poured, 0.150 g/cm was used as starting material.

200 kg/h Of coffee powder were supplied to the plant, and the quantity of powder recycled to the dryer amounted to approximately 130 kg/h.

Drying air at 50°C was supplied to the sieve. Drying air at 75°C, 82°C and 30°C, respectively, was supplied to the three sections of the dryer.

The water content of the moistened coffee powder was 8.9% by weight. Powder was produced in approximately the same quantity as the powder which was supplied, in that the water content of the final product was 3.5% by weight and an oversize-fraction of 5.0 kg/h was sifted off with a sieve having a mesh-width of 3.5 mm.

The bulk density, poured, of the finished product was 0.195 g/cm$^3$ and its sieve analysis was as stated below;

| | |
|---|---|
| > 2000$\mu$ | 21.1% |
| 1000 – 2000$\mu$ | 44.1.% |
| 800 – 1000$\mu$ | 13.9% |
| 500 – 800$\mu$ | 18.6% |
| <500$\mu$ | 2.3% |

Mean particle size: 1220$\mu$.

EXAMPLE II

A pilot plant was used in which the diameter of the supply tube was 5 cm. The disc was shaped as a cone with a top angle of 170° and with the top pointing towards the nozzle. The diameter of the disc was 22 cm and it rotated at 460 rpm.

The nozzle for moistening was placed at the level of the mouth of the supply tube.

A multi-fluid nozzle (Spraying Systems Co type ⅛ JAC) was employed. Steam at the rate 3–4 kg/h was used for atomization of water which was supplied to the nozzle at the rate of 3 kg/h.

15 kg/h Of a raw material consisting of approximately equal parts of soluble coffee powder, chicory and dextrose was supplied to the plant.

The raw material had an initial moisture content of 3.7%.

The powder which left the moistening chamber had a moisture content of 7.3%, and it was introduced direct to a vibrated fluidized bed dryer to which drying gas was supplied at 90°C. The dried product was sifted.

A final product with the following properties was produced.

| | | |
|---|---|---|
| Moisture content | 4.3% | |
| Bulk density, poured | 0.25 g/cm$^3$ | |
| do, tapped 100 times | 0.28 — | |
| Sieve analysis | >2000$\mu$ | 6% |
| | 1000–2000$\mu$ | 45% |
| | 750–1000$\mu$ | 25% |
| | 500–750$\mu$ | 12% |
| | <500$\mu$ | 12% |

We claim:
1. A method for producing agglomerated hygroscopic soluble powder products of coffee or coffee substitutes from a powder of the raw materials, said method comprising the steps of:
   a. dropping the raw materials
      i. in an unobstructed movement directly down towards a disc
      ii. a distance sufficient to permit moistening of the raw materials in the next-recited step;
   b. moistening the raw materials
      i. with an aqueous moistening agent
      ii. as they drop towards the disc
      iii. by an amount sufficient to cause agglomeration of the raw materials; and
   c. causing the disc to rotate with sufficient speed to cause the moistened raw materials to be thrown off the disc by centrifugal force, the disc being shaped so that the motion of the raw materials as they are thrown off the disc by centrifugal force is unobstructed.

2. A method as claimed in claim 1 wherein the disc is axially symmetric.

3. A method as claimed in claim 1 wherein the raw materials are uniformly distributed across the cross section of the moistening zone.

4. A method as claimed in claim 1 wherein preheated water is used as the aqueous moistening agent.

5. A method as claimed in claim 1 wherein water having a solid matter content of the same material as the raw materials is used as the moistening agent.

6. A method as claimed in claim 5 wherein:
   i. the raw materials are powdered coffee and
   ii. an aqueous coffee extract is used as the moistening agent.

7. A method as claimed in claim 6 wherein an aqueous coffee extract having a solid matter content of 10–50% is used.

8. A method as claimed in claim 1 wherein the aqueous moistening agent is supplied in such a quantity that the raw materials are moistened to a moisture content of 6–12% by weight.

9. A method as claimed in claim 8 wherein the moistening agent is supplied in such a quantity that the raw materials are moistened to a moisture content of 6.5–10% by weight.

10. A method as claimed in claim 1 wherein the disc is rotated at 200–3000 rpm.

11. A method as claimed in claim 10 wherein the disc is rotated at 600–1300 rpm.

12. A method as claimed in claim 1 wherein the raw materials are dropped on the disc at a rate of 0.2–5.3 kg/m$^2$ sec.

13. A method as claimed in claim 12 wherein the raw materials are dropped on the disc at a rate of 0.4–2.4 kg/m$^2$ sec.

14. Apparatus for producing agglomerated hygroscopic soluble powder products of coffee or coffee substitutes from a powder of the raw materials, said apparatus comprising:
  a. a chamber;
  b. means defining an inlet for the raw materials located in said chamber;
  c. means for moistening the raw materials
     i. with an aqueous moistening agent
     ii. as they drop into said chamber from said inlet
     iii. by an amount sufficient to cause agglomeration of the raw materials;
  d. a disc
     i. located vertically below said inlet by a distance sufficient to permit moistening of the raw materials as they fall in an unobstructed movement from said inlet
     ii. shaped so that the motion of the raw materials as they are thrown off the disc by centrifugal force is unobstructed;
  e. means for rotating said disc with sufficient speed to cause the moistened raw materials to be thrown off said disc by centrifugal force; and
  f. means for causing the raw materials to have a uniform distribution across the cross-section of the moistening zone.

15. An apparatus as claimed in claim 14 wherein said means for moistening the raw materials is a multi-fluid nozzle with an inlet duct for an aqueous moistening agent and an inlet duct for an atomizing agent such as air or vapour or a mixture thereof.

16. An apparatus as claimed in claim 14 wherein said means defining an inlet and said disc are axially symmetric.

17. An apparatus as claimed in claim 16 wherein the diameter of said disc is 1 to 10 times the diameter of said means defining an inlet.

18. An apparatus as claimed in claim 17 wherein the diameter of said disc is 3 to 5 times the diameter of said means defining an inlet.

19. An apparatus as claimed in claim 18 wherein the distance from said means defining an inlet to said disc is 1 to 10 times the diameter of said means defining an inlet.

20. An apparatus as claimed in claim 18 wherein the distance from said means defining an inlet to said disc is 4 to 7 times the diameter of said means defining an inlet.

21. An apparatus as claimed in claim 16,
  a. further comprising a tube
     i. for the introduction of raw materials into said chamber
     ii. operatively connected to said means defining an inlet and
  b. wherein said means for moistening the raw materials is a nozzle mounted at a distance inside said tube such that the atomizing cone of the nozzle clears the rim of said tube.

22. An apparatus as claimed in claim 14 wherein said disc is planar.

23. An apparatus as claimed in claim 14 wherein said disc has a slightly conical shape with the point facing said means defining an inlet.

24. An apparatus as claimed in claim 14 wherein said disc is provided with a coating of polytetrafluorethylene.

25. Apparatus for producing agglomerated hygroscopic soluble powder products of coffee or coffee substitutes from a powder of the raw materials, said apparatus comprising:
  a. a chamber;
  b. means defining an inlet for the raw materials located in said chamber;
  c. means for moistening the raw materials
     i. with an aqueous moistening agent
     ii. as they drop into said chamber from said inlet
     iii. by an amount sufficient to cause agglomeration of the raw materials;
  d. a disc
     i. located vertically below said inlet by a distance sufficient to permit moistening of the raw materials as they fall in an unobstructed movement from said inlet
     ii. shaped so that the motion of the raw materials as they are thrown off the disc by centrifugal force is unobstructed;
  e. means for rotating said disc with sufficient speed to cause the moistened raw materials to be thrown off said disc by centrifugal force; and
  f. means for adjusting the distance between said disc and said means defining an inlet.

26. Apparatus for producing agglomerated hygroscopic soluble powder products of coffee or coffee substitutes from a powder of the raw materials, said apparatus comprising:
  a. a chamber;
  b. means defining an inlet for the raw materials located in said chamber;
  c. means for moistening the raw materials
     i. with an aqueous moistening agent
     ii. as they drop into said chamber from said inlet
     iii. by an amount sufficient to cause agglomeration of the raw materials;
  d. a disc
     i. located vertically below said inlet by a distance sufficient to permit moistening of the raw materials as they fall in an unobstructed movement from said inlet
     ii. shaped so that the motion of the raw materials as they are thrown off the disc by centrifugal force is unobstructed;
  e. means for rotating said disc with sufficient speed to cause the moistened raw materials to be thrown off said disc by centrifugal force; and
  f. means for introducing a drying gas into said chamber.

* * * * *